Patented Nov. 29, 1927.

1,650,738

UNITED STATES PATENT OFFICE.

GEORGE ELTON RICE, OF BROOKLYN, NEW YORK, ASSIGNOR, BY DIRECT AND MESNE ASSIGNMENTS, TO CONSERVATION CORPORATION OF AMERICA, A CORPORATION OF DELAWARE.

PROCESS FOR TREATING, IMPREGNATING, SEASONING, AND STABILIZING WOOD.

No Drawing. Application filed August 30, 1924. Serial No. 735,218.

This invention relates to the art of treating, seasoning, impregnating, and stabilizing wood and wood products, especially the hardwoods, resinous woods and conifers, which are the classes and varieties used for marine and inland piling, mine, wharf and bridge timbers, railway ties and timber, factory and other flooring, and the like. The present process is akin to but distinguished from the process in my copending application filed July 18, 1924, Serial No. 726,834.

The fundamental object of the invention is to provide a novel process for treating wood and wood products of the character indicated in a simple, practical and efficient manner, in order to remove, without injury to the fibres, cell walls, etc., the extraneous matters, such as the natural sap, starches, sugars, gums, acids, oils, dyes, resin, tannins, albumen and other materials contained in the wood, and to replace such matters with a solution or substance that preserves and compacts the fibres, reduces the cell spaces and stabilizes the wood, thereby reducing the liability of warping, shrinkage and rot. The process may be used for the treatment of the wood in its natural state, without previous drying, freshly felled or green wood being preferred, and the substances extracted from the wood are recovered in order to obtain valuable by-products. The wood is freed of such materials without the materials coagulating, thereby preventing the liability of fracturing the cell walls or fibres and reducing season checking and degrading. The process is also such that the wood is treated without breaking down of the cell walls, to obtain the full strength of the cell walls and fibres, and so that the cell walls are swollen to reduce the air or absorption spaces, said cell walls being filled or impregnated and the fibres filled or compacted. Furthermore, the spongy or soft portions are filled and after the oxidation of the preserving materials has been completed, with natural or artificial drying, the absorption properties of the wood are equalized.

A further object is the use in the saccharine solution of maltose, to increase the efficiency of the treatment and results obtained, it having been found that maltose, a mono-saccharose, when used in lieu of dextrose or dextrin, is more strongly dextrorotary and has greater osmotic action. The maltose also forms a phenyl ozazone combined with the syrup or molasses (cane or beet) or neutral sugar, which is of advantage in carrying out the process and in the results obtained.

Another object is to impregnate the wood with a toxic poison or poisons, combined with the solution, which will prevent the fermentation of the solution when not being used, as well as aiding in the rapid drying of the treated wood, in addition to destroying or repelling destructive organisms and fungi. The poison used (a crystal violet dye base) is highly toxic and prevents the growth in or entering into the wood of wood destroyers and fungi. Thus, while the solution seasons, stabilizes and strengthens the wood, by expelling the excess matters and replacing same, the toxic poison will render the wood proof against insects, fungi and rot, including *Limnoria lignorum*, *Bankia gouldi* (ship worm) and other destroyers, borers of marine growth, such as *Lenzites sepiaria*, *Lenzites trabia*, *Trametes serialis*, *Lentilua lepideus* and *Trametes carnea*, the group of fungi called the "dry rot group". including *Merulius lacrymans* and *Caniphora cerebells*, and similar groups of destructive wood borers, chewers, eaters, etc.

A still further object is to embody in the process, if so desired, the saturation or impregnation of the treated wood with an oil, to assist in removing excess matters and stabilizing the wood, as well as rendering same a non-conductor of electrical energy and moisture proof. The penetration of the wood with the oil will also ensure practically permanent results for use of the wood in any climate, and the oil will also encapsule the poison or poisons, to prevent same from leeching out. The oil will also serve as a filler for the wood so that the wood will take paint, varnishes and other finishes with good effect, and the presence of oil in the wood, especially at the surfaces thereof, reducing wear, friction and abrasion.

The process is based upon the underlying natural laws that all colloidal substances, of which wood is the most important, absorb their similars under certain conditions; and that all colloidal substances become stable after being raised to a degree of heat specifically peculiar to each of them; from which it results, that in carrying out my process, the solution which is absorbed by the wood will be thoroughly assimilated by the tissues and held in combination with the fibres of the wood and in the interstices, and no matter how hard the wood is it will be cleansed of extraneous matters, and the live, summer or sap wood stabilized to equal the heart or fixed growth of the wood, without the aid of vacuum or pressure equipment in producing the required treatment.

The proportions of the constituents of the solution may vary, and, as an example, for freshly felled or air dried southern long or short leaf pine, varieties of gums, ash, maple, varieties of birch, cedars, chestnut, cottonwood and similar woods used for railway and kindred industries, the proportions of the solution are substantially as follows:

An aqueous saccharine solution is made having a specific gravity of about 1040 to 1050, using the ordinary heavy standard gravity hydrometer used in Great Britain, which is scaled from 1000 to 1200 and which registers the specific gravity of pure water as 1000 at a temperature of 60° F. To such saccharine solution there is added 20% of maltose, 3½% of sodium fluoride, 1½% of sodium sulphate, and one part to 10,000 parts of the solution of crystal or methyl violet dye, or other crystal violet dye base. The base of the saccharine solution may be refiner's blackstrap molasses, or refiner's syrup, mostly sucrose and natural dextrose in content, being the product of cane. Malt sugar may be substituted in place of refiner's syrup or blackstrap molasses, or sweet potato syrup may be used when available. The ingredients may be incorporated in the saccharine solution in a convenient manner, and, if desired, solutions of the separate constituents may be made and added to the saccharine solution.

A typical specific solution such as used for the treatment of long or short leaf pine timber (used for railway ties, cross arms, planking, etc.) comprises 1250 pounds of water, 200 pounds of refiner's blackstrap molasses or refiner's syrup, 50 pounds of maltose, and one ounce of crystal or methyl violet dye and, when completed toxicity is desired, also 30 pounds of sodium fluoride. To aid in more complete deresination of heart stock long or short leaf pine there is added 1½ percent, by weight, of sodium sulphate.

In carrying out the process, the wood may be of any shape or form, either logs, squared timber, or wood products cut to shape or dimensions, and if logs are treated, it is unnecessary to remove all the bark, inasmuch as the presence of the bark adds to the value of the by-products recovered and does not interfere with the treatment. The wood to be treated is immersed in the solution, and this can be done in several different ways, such as by loading the wood in piles or stacks in or on a rack or flat truck, skid or other form of conveyance which is run into the tank, or the wood may be conveyed into the curing tank by an overhead or automatic conveyor. The wood or lumber can also be piled or stacked up in the tank. It is desirable to reduce the handling of the wood to a minimum by loading the wood on skids or trucks, or in cradles or other carriers, so that the timber or wood can be handled more in bulk.

An open tank is used to contain the solution in which the wood is immersed, and the tank may be of any height and length, but is preferably not over 7½ feet in width to assure of the desired and rapid circulation of the solution. One or both ends of the tank may be arranged to open so that trucks or skids can be run into and out of the tank, when the tank is empty, to facilitate moving the wood into and out of the tank, the ends of the tank being closed and sealed when a load of wood to be treated has been moved into the tank. The solution is then run into the tank by gravity or pump pressure until the wood is immersed to about five inches over the top of the load, at a temperature averaging not over 130° F. for hardwoods and 145° F. for soft woods or conifers.

The solution in the tank may be heated directly or indirectly, a preferred manner of heating being by the use of steam coils or radiators submerged in the solution within the tank, so that the temperature may be raised gradually to and maintained at the boiling point of water.

When the wood is immersed in the solution, it is allowed to remain in the solution at the original temperature until the wood becomes thoroughly heated throughout and parts with a considerable amount of air and sap, before the temperature is raised. When sufficient air and sap have been driven off from the wood, the temperature is gradually raised to ebullition or the boiling point (212° F. at sea level) and is maintained at such temperature until no further air, scum or oils leave the wood.

When the wood has been boiled a sufficient length of time, ranging any where from a fraction of an hour to several hours, and no further scum rises to the surface of the liquor, then the wood is removed either immediately or allowed to remain until impregnated to a required density, according to the use or requirements. For many purposes, the wood is immediately removed when ebullition or boiling is completed, especially when the wood is to be further treated by impregnation with creosote oil, combination oils, organic oils or similar encapsuling or lubricant oils which encapsule the poison and lubricate the wood. For other purposes, the wood is allowed to remain in the solution after the boiling period has passed and during the cooling of the solution, either by natural or artificial cooling. The wood may be removed at different temperatures. For example, long leaf and short leaf pine are removed from the solution when it has cooled to temperatures ranging from 160° to 120° F.

The average specific gravity of the solution during the treatment should be kept about 1060 to 1070, adding only water during the boiling period to maintain such specific gravity. No solution should be added during the boiling period, inasmuch as same may interfere with the osmotic action and the expelling or cleansing of the excess matters from the wood during the treatment, such actions being checked or retarded if the solution is interfered with appreciably other than being thinned by the addition of water.

By using the crystal or methyl violet dye, protection is had against the wood destroying organisms and fungi, and such protection is enhanced by the inclusion of sodium fluoride. When the wood is used for marine purposes, the crystal or methyl violet dye is added to the solution in the proportion of one part of dye to 10,000 parts of the solution. When the wood is used for inland purposes, and not subject to marine conditions, smaller proportions of the poison can be used, ranging from one part to 20,000 parts of solution to one part to 50,000 parts of solution. Such poison will also prevent the fermentation of the solution when the solution is not being used, such as when it is standing idle, and the poison also aids in the rapid drying of the treated wood.

The deresination of resinous wood is obtained by the use of sodium sulphate in the solution, amounting to from 1½ to 5%, by weight, of the solution, the proportion of such material used being in accordance with the amount of resin in the wood. For example, southern long leaf heart pine will require at least 5% of sodium sulphate in the solution, while douglas fir and hemlock require not exceeding 1½ to 3¼% of such ingredient.

During the treatment or boiling of the immersed lumber in the solution, the solution penetrates the wood, and owing to osmotic action the solution acts under pressure from all sides in the wood, and a steady stream of air is expelled from the wood. Sap flows out of the ends of each piece of timber, and as the treatment continues, a steady flow occurs from both ends and the sides. The pines respond very readily to the treatment, while other woods expel through and receive the impregnation by way of the medullary rays, inasmuch as some varieties of woods have no resin canals or sap vessels, so that the penetration takes place through the walls of the tracheids. In any case, the preservatives enter the live, sap or summer wood speedily and completely, and more slowly into and through the heart or mature wood, and all living organisms present when treatment begins are destroyed. The wood is sterilized and the poison prevents further action of any fungus or wood destroyers.

The process is a natural one, the action of a similar on a similar, and as the wood is impregnated by capillary and osmotic action, the excess matters removed from the wood are recovered, and the preservatives replace the excess matters, slowing drying and oxidizing in combination with the fibres and cell walls, and filling the interstices. The cell walls become swollen during the treatment, which remain swollen, thereby reducing the air spaces. The chemicals added, other than the carbohydrates, give additional protection against the attacks of wood destroying organisms or fungi.

During the process of treating, a cover or hood is lowered over the top of the tank and all vapors rising during the boiling of the wood in the solution are allowed to pass through a cooling or condensing tube or coil, and the condensate is preserved for the recovering of by-products therefrom. The scum which rises to the surface of the liquid is also trapped or collected by a suitable trap or skimming device, during the boiling of the solution, for the recovering of other by-products. The solids and liquids of the scum are separated by means of a centrifugal, or other means. The condensate obtained from the vapor, and the solids and liquids obtained from the scum can be put through known recovery processes for obtaining valuable by-products, including turpentine and other volatiles, heavy oils, gum, acids, sugars, albumen, etc., all of which are lost or wasted by prevailing wood-treating processes. With the present process such by-products are conserved for valuable uses, and the value obtained by such by-products will materially lessen the cost of carrying out the present process.

As soon as the wood is removed from the solution, the solution is ready for the next load of lumber. If the lumber is run out of the tank on skids or trucks, the solution is first withdrawn from the tank to permit the end or ends of the tank to be opened for running out the treated lumber and running in the next load, after which the end or ends of the tank are closed and the solution again run into the tank.

If drying of the wood is necessary, for specified purposes, it should be dried in a dry kiln equipped with an improved method of spraying, and it is essential to bear in mind that drying is accomplished by proper control and action of circulation, humidity and dry heat, to prevent checking, degrading and other faults.

When it is desired to water proof the wood and to insulate same for electrical purposes, the wood, after being removed from the saccharine solution, is placed in a tank containing the oil used for that purpose or into which the oil is placed, so that the wood is immersed in the oil. The temperature of the oil is gradually raised from atmospheric temperature to a temperature ranging from 200 to 240 degrees F., depending on the class or kind of oil used. Tung oil or Chinese wood oil requires a temperature of from 230 to 240 degrees before the expelling of air and hygroscopic moisture is accomplished, while raw linseed oil requires only up to 220 degrees F.

The heating of the wood in oil is continued, from a fraction of an hour to several hours depending on the wood, until bubbles cease to rise to the top of the oil. at which time the temperature is decreased and the oil cooled down to 200 degrees or as low as 140 degrees, based on the amount of impregnation desired and the density of the wood. Conifers require a lower cooling point than open or porous woods like birch, beech and similar hardwoods. This step is especially desirable for impregnating such woods as hickory, maple, birch and other woods, with an organic wood oil, such as tung or Chinese wood oil, perilla (an oil produced in Japan), raw linseed oil, or soya bean, or combinations of any of said oils, or a rubber sap called latex. This step is used for impregnating and filling or partly filling the woods to protect and water proof same, or to prevent moisture entering the wood, which is especially desirable when the wood is designed to be used for electrical purposes, such as for transformers, cross arms, and other insulating purposes. Wood so treated is also especially suitable for use in automobile spokes and the like. The oil will also encapsule the poisons in the wood, by forming minute capsules enveloping the poisons, so as to prevent the poisons from leeching out. The oil also ensures practically permanent results for use in any climate. The oil, especially at the surfaces of the wood, will reduce wear, friction and abrasion, and the oil also acts as a filler for the wood, so that the wood will take paint, varnishes and other finishes with telling effect, and reducing the number of coats required.

During intervals of say four or more treatments there should be added to the saccharine solution about from six to ten drops per gallon of solution of hydrochloric acid (muriatic acid) which will precipitate the tannates, etc., that have combined with the solution or which are too heavy to rise to the top of the solution, thereby clarifying the liquor to its previous clearness.

Having thus described the invention, what is claimed as new is:—

1. The process of treating, impregnating and stabilizing wood consisting in immersing the wood in a saccharine solution containing maltose.

2. The process of treating, impregnating and stabilizing wood consisting in immersing the wood in a saccharine solution containing a large proportion of maltose.

In testimony whereof I hereunto affix my signature.

GEORGE ELTON RICE.